Nov. 13, 1956 H. R. KWIECINSKI 2,770,043
TILER'S GAUGE
Filed June 19, 1951
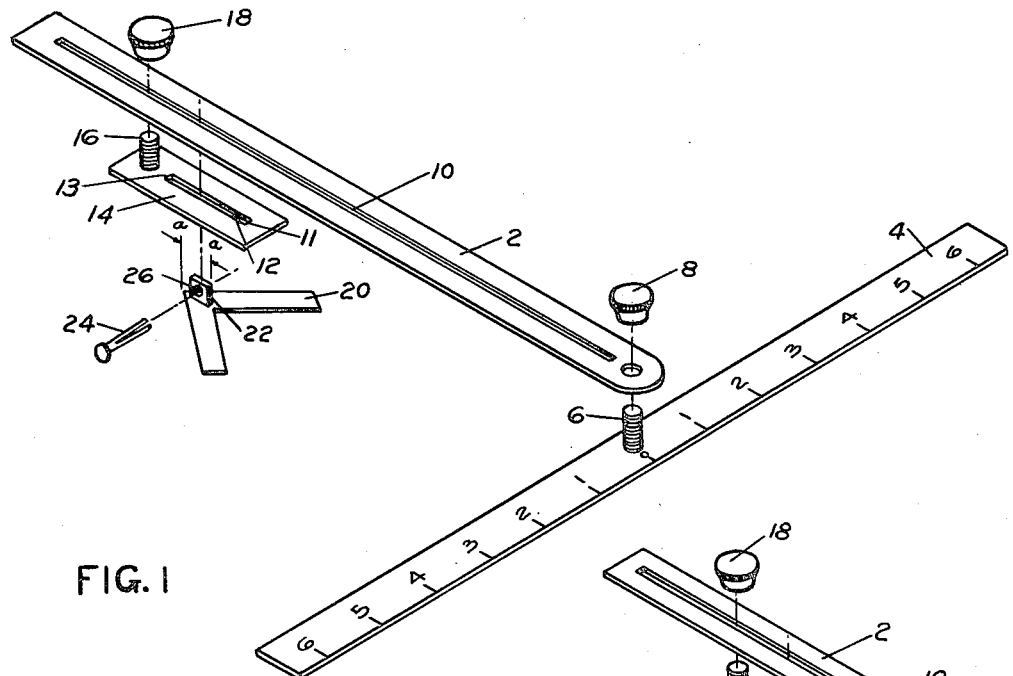
FIG. 1
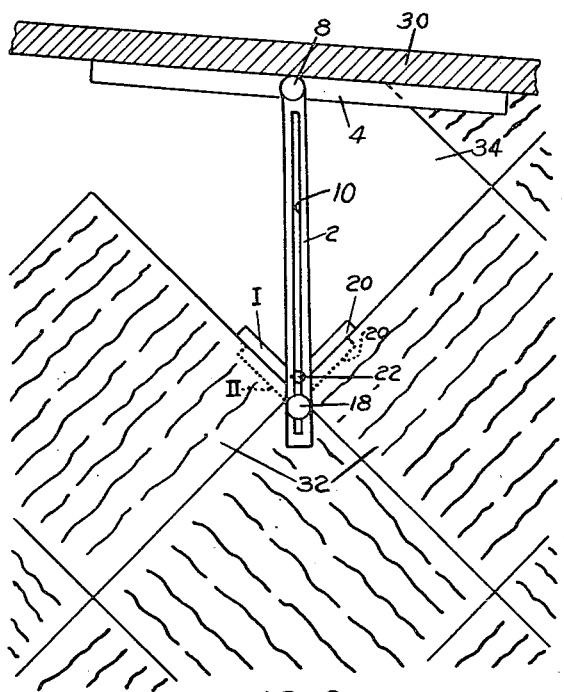
FIG. 2
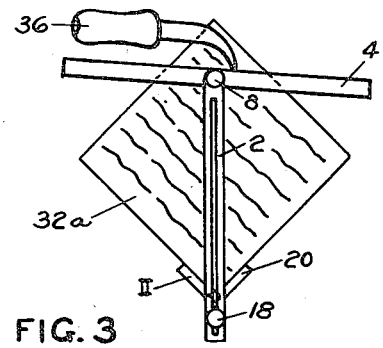
FIG. 4
FIG. 3
INVENTOR
HENRY R. KWIECINSKI
BY Bradley Cohn
ATTORNEY United States Patent Office 2,770,043
Patented Nov. 13, 1956

2,770,043

TILER'S GAUGE

Henry R. Kwiecinski, Brooklyn, N. Y.

Application June 19, 1951, Serial No. 232,389

11 Claims. (Cl. 33—94)

This invention relates in general to measuring instruments, and more specifically to an instrument for measuring composition tiles, linoleum blocks, and the like.

The principal object of by invention is to provide a convenient and simple means whereby an operator may quickly and accurately ascertain the line along which tiles of blocks may be cut to fit a specific space.

In the laying of tile for floors, ceilings and walls, the last row of tile laid normally must be fitted to a smaller than tile size space. Moreover, this space is rarely ever a true rectangle. Walls or floors are usually somewhat out of line or out of plumb. Heretofore, it has been necessary for the operator to take time-consuming measurements and plot them on his tile to establish his line of cut. I have therefore invented a device that may accurately determine the dimension and angulation of the space to be occupied by the tile and quickly applied to the tile to locate thereon the line of cut.

My device is particularly adaptable for use when floor tile is laid "diagonally" to the walls of a room. It, of course, may be used with equally good effect when laying tile parallel to the walls of a room. I will generally refer herein to the laying of floor tile, though it is obvious that the same applies to wall or ceiling tile.

In the accompanying drawings:

Fig. 1 is an exploded view of a preferred embodiment of my invention;

Fig. 2 is a diagrammatic view illustrating the use of my invention for measuring a bounded area;

Fig. 3 is a diagrammatic view illustrating in smaller scale the cutting of a tile to fit the area shown in Fig. 2; and Fig. 4 is an exploded partial view of a modified form of the invention.

Referring to Fig. 1, the tool consists of a stempiece 2 and a pivoted head bar 4. The head bar 4, which may be graduated if desired, is pivoted to the stem 2 by means of a threaded stud 6 fastened to the bar 4 and secured by nut 8. By tightening nut 8 the bar 4 may be frictionally secured against rotation relative to the stem 2.

In stem 2 there is formed a longitudinal slot 10 along which is slidingly mounted a slotted member 14 and a square 20. Member 14 is mounted in slot 10 by the threaded bolt or stud 16 and knurled nut 18. A block or stud 22 is integrally secured to the square 20. This block 22 slidingly fits through slot 12 of member 14 and slot 10 of stem 2, thereby preventing rotation of member 14 around pivot 16. Withdrawal of the block 22 from the slots 12 and 10 is prevented by friction pin 24 inserted through a bore 26 in block 22. Slot 12 is of critical length with respect to block 22 and square 20. The length permits square 20 to slide along member 14 no more and no less than the distance between the inside and outside of the square 20, i. e., the distance a—a indicated in Fig. 1.

In Fig. 4, I have illustrated a modified embodiment of my invention. Here like figures equal like parts of the first embodiment illustrated in Fig. 1. Member 20a is a straight flat bar mounted in the slots 12 and 10 in the same manner as the square 20 of Fig. 1. The bar 20a moves in slot 12 a distance equal to its own width.

Referring now to Figs. 2 and 3, the operation of the tool is as follows:

The operator grasps in his left and right hand the knurled nuts 8 and 18 respectively, places the bar 4 against the wall or abutment 30. He then pulls knurled nut 18 along slot 10 and away from nut 8 until the square 20 engages a corner formed by the outer edges of the tiles 32 and block 22 moves to the end or abutment 11 of the slot 12 thereby carrying the square 20 to position I shown in Fig. 2. He then tightens both knurled nuts 8 and 18 to "fix" the dimension and angulation established. Applying the tool to the block 32a (Fig. 3) which is to be fitted to space 34, he places the inside of the square 20 over an outer corner of tile 32a pulling by means of either or both of the knurled nuts 8, 18 to the diagonally opposite corner of tile 32a. This causes block 22 to slide to the end or abutment 13 of the slot 12 thereby moving square 20 to position II. In this manner, as illustrated in dotted line position II of Fig. 2, the inner edge of the square 20 is now located relative to the head bar 4 in the exact position the outer edge of the square was when the original measurement of space 34 was made. By drawing a knife or stylus 36 along the scale edge of the head bar 4, tile 32a will be a perfect fit for the space 34.

Occasionally, as with fitting a tile to an inwardly projecting corner, such as formed in a room having a niche or an inwardly projecting column or fire-hearth, it is necessary to take two intersecting cuts to fit the tile around the corner. For this purpose, I have conveniently arranged linear graduations on the head bar 4. The length of the line of cut on the tile may thereby be ascertained where such length is less than all the way across the tile.

Referring to Fig. 4, this embodiment is used in laying tile parallel to the wall. In this modification the bar 20a is placed flat against the edge of laid tile 32 in the same manner as the square 20 is placed in the corner formed by the two laid tiles 32. It will be noted that the bar 20a, being rectangular, will serve as a square at any of its corners.

It should be further noted that the preferred embodiment shown in Fig. 1 is useful for laying tile parallel to a wall. Other modifications may be made within the scope of the appended claims.

I claim:

1. A device of the class described having an elongated member, a bar pivotally secured at one end of said member, a guide plate slidably mounted along said elongated member, means to secure said guide plate to the elongated member in any selected position therealong, a member having opposed parallel edges slidably secured to said guide plate for limited movement relative thereto, means to limit the movement of said members along said guide plate a distance equal to the distance between said parallel sides and in a direction parallel to and along said elongated member whereby said tool may measure the internal aspects of a bounded cavity and apply such measurement externally to an object to be fitted in said cavity.

2. A measuring device for gauging rectangular tiles to fit an area of predetermined size including an elongated shank having a longitudinal slot, a bar pivotally secured to one end of said shank, a support slidably mounted in the elongated slot for longitudinal movement along said shank, means to arrest said bar in its movement around its pivot relative to said shank, other means to arrest the movement of said support along said shank, a square slidably mounted in said support for movement parallel to the axis of said shank, means to limit the motion of and square in said support a distance exactly equivalent to the longitudinal distance between the outer and inner aspects of said square whereby the outer aspects of said square may be used in measuring the space to be filled and the inner aspects may be used to gauge a tile to be fitted to said space.

3. A gauging device comprising an elongated shank having a pivoted T on one end thereof, a member having a foot having parallel inner and outer sides slidably mounted along said shank, means to secure said member at any point along said shank, and further means slidably mounting said foot on said member to permit said foot to move along said shank only a distance to displace itself when said first-mentioned means have otherwise secured said member against sliding motion along said shank so that one of said parallel sides moves to the locus of the other of said parallel sides.

4. A measuring device for gauging rectangular tiles to fit an area of predetermined size including an elongated shank having a longitudinal slot, a bar pivotally secured to one end of said shank, a support slidably mounted in the elongated slot for longitudinal movement along said shank, means to arrest said bar in its movement around its pivot relative to said shank, other means to arrest the movement of said support along said shank, a transverse bar slidably mounted in said support, and instrumentalities on said support to positively limit the movement of said transverse bar in said support in the direction of the axis of said shank a distance equal to the width of said transverse bar.

5. A measuring tool suitable for locating a straight line of dissection through a rectangular area comprising a T-square so constructed and arranged that its head is rotatably pivoted on its shank, a foot having parallel opposite sides slidably movable along said shank, said foot being formed as a right angle so positioned that its lesser angle is toward said head and said shank disects said angle, device slidable along said shank constructed and arranged to engage said foot to positively limit the movement of said foot along said shank a certain predetermined distance equal to the linear distance between the opposite parallel sides of said foot in a direction parallel to said shank, and securing means on said device to arrest the movement of said device selectively along said shaft.

6. A modified T-square suitable for taking equivalent internal and external measurements whereby an object may be fitted to an area to be occupied thereby, comprising a square, a guide plate movable along the shank of said square, means to arrest said guide plate along said shank, a member having opposite parallel forward and rearward boundaries movable in said guide plate, and instrumentalities on said guide plate to positively limit the movement of said member in said guide plate to only the distance between its forward and rearward boundaries as measured along a parallel to the axis of said shank.

7. A measuring tool suitable for locating a straight line through a rectangular area comprising a modified T-square constructed and arranged so that its head is pivoted on a shank, a second T-member slidably mounted along said shank, a guide plate movable with said second T-member, said guide plate and said second T-member being secured to each other in sliding relation, instrumentalities on said T-member and on said guide plate to positively limit the movement said T-member may move with respect to said guide plate to a distance equal to the longitudinal dimension of said T-member measured along said shank and means to arrest the sliding movement of said guide plate at a selected point along said shank.

8. In a device of the type described, the combination of an elongated shank, a cross-bar pivotally secured to one end of said shank, linear graduations on said crossbar, a support slidably mounted on said shank for longitudinal movement therealong, gripping means to frictionally retard the movement of said support, a member having opposite parallel sides slidably mounted in said support for movement on said support in a direction parallel to said shank, abutments on said support to limit the movement of said member in said support to a distance equal to the linear distance between opposite parallel sides in the direction of movement.

9. A measuring device suitable for use in measuring square tile to fit a less than normal size area comprising an elongated stem, a head bar pivoted substantially at its midpoint to the end of said stem, a guide plate movable along said stem forwardly toward said head bar and rearwardly away from said head bar, means to lock said guide plate at a selected point along said stem, a foot having oppositely positioned parallel forward and rearward margins movably mounted on said guide plate to move along the guide plate in a direction parallel to said stem, and abutments to limit the forward and rearward movement of said foot along said guide plate, said abutments being spaced apart a certain distance to limit the movement of said foot in said plate to the distance between the forward and rearward aspect of said foot.

10. A tile gauge adapted to measure the area to be occupied by tile and applied directly to the tile, comprising an elongated shank having a cross bar and a slide movable along said shank, means to set said slide in a predetermined position on said shank, a foot having oppositely positioned gauging surfaces slidably mounted along said slide, means to limit the motion of said foot along said slide a predetermined maximum distance equal to the dimension of the foot projected along a parallel to said shank whereby a measurement between said cross bar and a rearward gauging surface of said foot may be established, and said slide may be secured to said shank and said foot moved on said slide to establish the same measurement between said cross bar and the forward gauging surface.

11. A measuring device suitable for measuring square tile to fit a less than normal size area comprising an elongated stem having a longitudinal slot cut along substantially its entire length, a cross bar pivoted substantially at its midpoint to the end of said stem, a guide plate movable along said stem, said guide plate having means engaging said slot formed in said stem, said engaging means being further adapted to secure at will said guide plate against movement along said stem, said guide plate having formed therein a longitudinal slot of a predetermined length, a foot having oppositely positioned parallel forward and rearward margins, an upwardly extending lug on said foot adapted to engage the slot formed in said guide plate when said device is assembled with said guide adjacent said stem and secured thereto, said lug being formed with respect to the slot in said slide so that it may move a maximum center to center distance in said slot exactly equal to the linear distance between the forward and rearward margins of said foot in a direction parallel to said stem.

References Cited in the file of this patent

UNITED STATES PATENTS

| | | |
|---|---|---|
| 847,720 | Barbo | Mar. 19, 1907 |
| 994,741 | Gorenflo | June 13, 1911 |
| 1,160,920 | Lucas | Nov. 16, 1915 |
| 1,205,687 | Verhey et al. | Nov. 21, 1916 |
| 1,370,505 | Andree | Mar. 8, 1921 |
| 1,619,091 | Rieser | Mar. 1, 1927 |